United States Patent [19]

Lee

[11] Patent Number: 4,974,935
[45] Date of Patent: Dec. 4, 1990

[54] SHIELDING DEVICE FOR COLOR TELEVISION SCREEN

[76] Inventor: Chin-Fu Lee, 2 Fl. No. 68, Lo Yeh St., Taipei, Taiwan

[21] Appl. No.: 373,130

[22] Filed: Jun. 29, 1989

[51] Int. Cl.⁵ ........................ G02B 27/00; H04N 5/65
[52] U.S. Cl. .................................. 350/276 R; 358/247
[58] Field of Search ..................... 350/276 R; 358/247

[56] References Cited

U.S. PATENT DOCUMENTS 4,253,737  3/1981  Thomsen et al. ............... 350/276 R
4,760,456  7/1988  Liang ................................... 358/247
4,819,085  4/1989  Liang ................................... 358/247

FOREIGN PATENT DOCUMENTS 0928688  6/1963  United Kingdom ............ 350/276 R

Primary Examiner—Bruce Y. Arnold
Assistant Examiner—Rebecca D. Gass
Attorney, Agent, or Firm—Browdy and Neimark

[57] ABSTRACT

A shielding device for use on a color television screen has an electrically conductive mesh formed by knitting of black, anti-reflection conductive filaments, the diameter of the filaments being between 20–100 micrometer and the individual mesh being between 45–230 micrometer, and has a frame supporting the conductive mesh, the angle created between the filaments direction and the frame being in the range of 10–45 degree, and the conductive mesh lays over surface of a color television screen in a very close contact.

3 Claims, 3 Drawing Sheets

SHIELDING DEVICE FOR COLOR TELEVISION SCREEN

FIELD OF THE INVENTION

The present invention relates to a shielding device for use on a color television screen, more particular to an installation to the screen face or eliminating electrostatic charges and low frequency radiation, and weakening glare and reflection therefrom.

BACKGROUND OF THE INVENTION

Recently, there has been a rapid increase in the use of video display terminals (VDT's) and the like. It has been shown that the surface of the cathode ray tube (CRT) in a VDT reflects glare from the surrounding environment which, in many instances, causes the user to experience eye fatigue and headache. A framed mesh screen of black filaments disclosed in U.S. Pat. No. 4,253,737 has been introueced to overcome the glare problem.

A potentially more serious problem with VDT's is their tendency to generate an electrostatic field adjacent to the CRT. This problem has recently been classified as a potential health hazard. In fact, many facial rash cases amount VDT operators have been reported. This is attributable to the operator becoming electrically charged in the electrostatic field of the CRT so that dust and other pollutants, such as bacteria or other irritants, of opposite charge are attracted to the operator. The dust carrying opposite charge may also be attracted to the surface of the CRT and pollute the VDT screen as a result of the induced static charge. The risk of nonionizing radiation in VDT screens that has been debated for several years. It was reported that current levels of electromagnetic radiation which emanate from the CRT are well below the level at which the operator may become injured. However, such radiation does exist and older VDT's and those in a worsened condition most likely will produce radiation at levels which exceed the FDA standard allowed for television sets. At present, low frequency radiation is eleiminated by a stainless steel (or other metal) mesh screen sandwiched between to rigid panels placed in front of the VDT screen. Due to the space between the screens and the display tubes, such devices produce Newton rings and Morie distortions. Mesh screens designed to eliminate such distortions are shown in U.S. Pat. Nos. 4,253,737 and 4,468,702.

As disclosed above, the screen of U.S. Pat. No. 4,253,737 was introduced to overcome the glare problems. The nylon screen disclosed in U.S. Pat. No. 4,468,702 is formed of a plurality of nylon yarns, some of which are electrically conductive. However, the method of making this screen is quite complicated and produces screen where only a fraction of the warp and weft fibers of the screen are electrically conductive. As disclosed of U.S. Pat. No. 4,760,456 was introduced, a conductive screen formed of a frame and a series of electrically conductive fibers. The screen is fitted over the display surface of a cathode ray tube (CRT) and connected to a ground wire to diffuse emanated radiation and static electricity.

OBJECTS OF THE INVENTION

The present invention is directed to providing a high efficient shielding device to install to color Television display surface having specialities:

(1) Glare generated from a television screen will be obstructed by a black mesh wall to become weak, (2) Reflection caused by light projection from upper side or window aspect will also meet the block of block mesh wall to be weakened, bringing improved viewing state for the viewers, and (3) The emanated electrostatic charges and low frequency radiation will be absorbed by the black electrically conductive mesh an eliminated by means of a ground wire assembly in connection.

SUMMARY OF THE INVENTION

The shielding device comprises a frame, an electrically conductive mesh, and a ground wire. That is most characterized by black anti-reflection conductive filaments, which is knitted to be the conductive mesh, the diameter of which is limited between 20 to 100 micrometer and the individual mesh width should be within 45 to 230 micrometer range, and which filaments direction laid against the frame should be angle of 10 to 45 degree. After the framed conductive mesh is mounted to the screen surface or in front of it of a color television set, glare, reflection reduction and electrostatic charges and low frequency radiation elimination can be realized.

BRIEF DESCRIPTION OF THE DRAWING

A specific embodiment of the invention will now be described by way of example with reference to the accompanying drawings in which.

SPECIFIC DESCRIPTION

Figure 1:
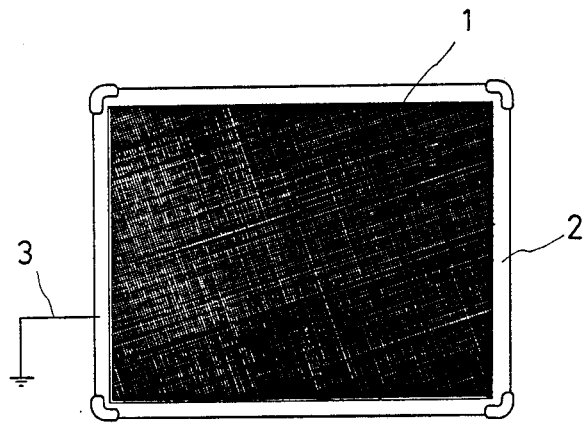
FIG. 1 is a perspective view according to the invention.
Figure 2:
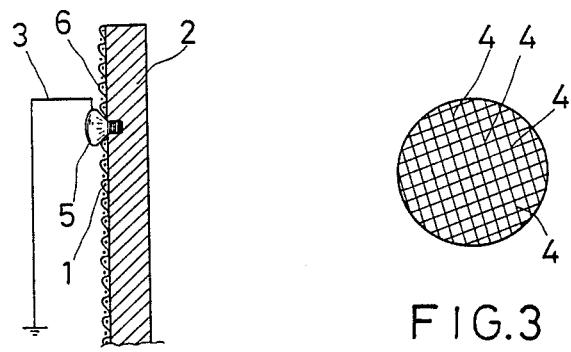
FIG. 2 is an enlarged fragmentary view showing the frame which is connected to the ground wire in FIG. 1.
Figure 3:
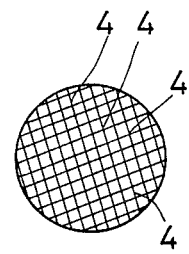
FIG. 3 is an enlarged fragmentary view at the electrically conductive mesh on FIG. 1.

Referring to FIGS. 1, 2 and 3, the invention comprises an electrically conductive mesh 1, a rigid frame 2, and a ground wire 3 connected to ground. The electrically conductive mesh 1 comes to form by knitting with black anti-reflection filaments 4, diameter of which is adapted to the scanning line number of a cathode ray tube used, and the most ideal filament in diameter for use is from 20 to 100 micrometers and the mesh aperture in width is from 45 to 230 micrometers that experiments conclude. Filaments 4 can be metallic yarns, or artificial fibers with a coating of electrical conductive substance, given anti-reflection treatment to the surface, and by cross knitting comes to be an electrically conductive mesh 1 (as shown in FIG. 3). Then, by conductive glue 6 means, mesh 1 is adhered to rigid frame 2 at a preferred 10–45 angle degrees with filaments 4 direction against rigid frame 2, in this manner that Newton rings and Moires distortion are avoided as experiments verified. Connected to conductive mesh 1 by means of conductive glue 6, rigid frame 2 turns to be an electric conductor (as shown in FIG. 2). At a proper conductive position of rigid frame 2, ground wire 3 with a connector 5 attached makes connection thereto, this way establishing an open conduction route from mesh 1 to rigid frame 2 to ground wire 3, while the other end of ground wire 3 is connected to ground. It is understood that this arrangement makes the electrostatic charges which is absorbed by conductive filament 4 of conductive mesh 1 be guided to ground to accomplish elimination, keeping the air of negative and positive ions composition normally balanced without any interference.

Figure 4:
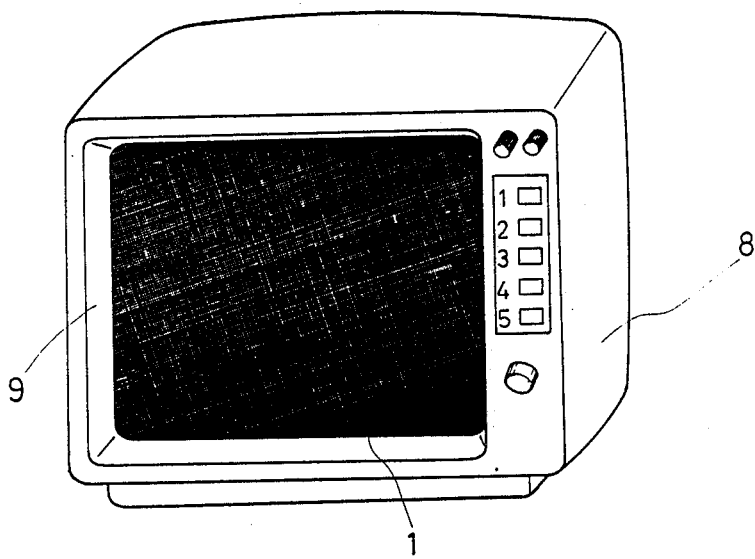
FIG. 4 is a perspective view of a television set showing the invention installed on the surface of a television display screen.
Figure 5:
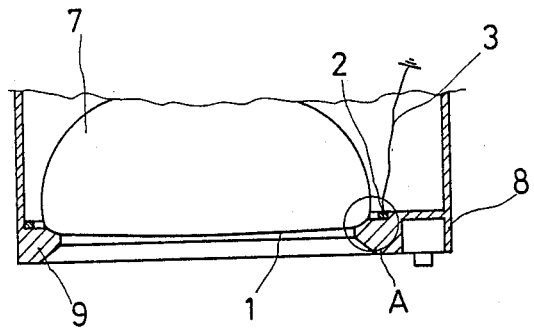
FIG. 5 is a cross-sectional view of FIG. 4.
Figure 6:
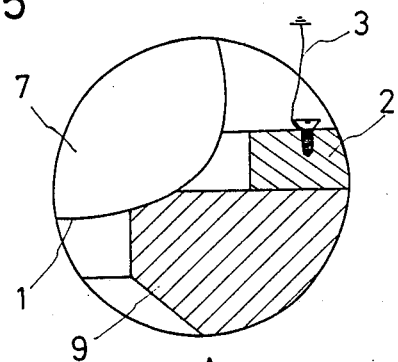
FIG. 6 is an enlarged view of (A) position of FIG. 5.
Figure 7:
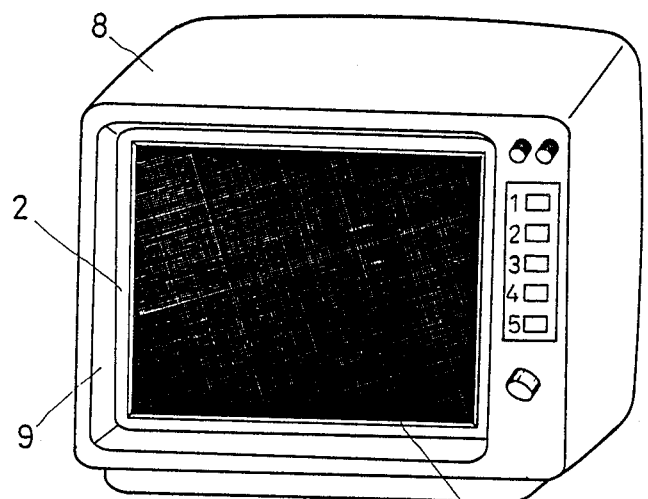
FIG. 7 is a perspective view of a television set showing the invention installed in front of a television display screen.
Figure 8:
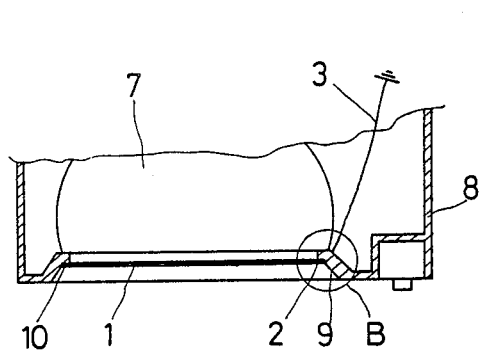
FIG. 8 is a cross-sectional view of FIG. 7.

As FIGS. 4, 5 and 6 illustrate, during television manufacture stage, conductive mesh 1 can be integral with the display screen of cathode ray tube 7 to be put together inside television case 8 and behind front frame 9, the periphery of which contacts with the periphery of the rear of front frame 9 and taking advantage of the fixing nature of cathode ray tube structure (not shown in drawings), cathode ray tube along with conductive mesh 1 smoothly gets fixed therein. It is in arrangement that conductive mesh 1 makes close attachment to the television screen, rigid frame 2 and ground wire 3 stay inside television case 8, and an end part of ground wire 3 extends the case 8 rear making ground connection.

Figure 9:
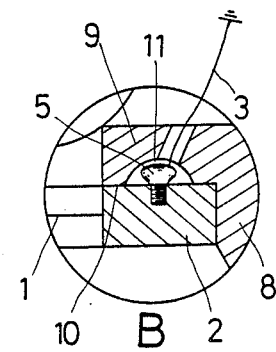
FIG. 9 is an enlarged view of (B) position of FIG. 8.

Referring to FGIS. 7 and 8, it is shown that the invention can be optionally installed in front of a television screen. For this installation manner, inside the front frame 9 ahead of television case 8, a concave connection frame 10 is created in size adapted to rigid frame 2 to enable the invention be set in fittingly. To accommodate ground wire 3 which has a connector 5 attached, a suitable pit 11 (as shown in FIG. 9) at proper location is provided in the concave connection frame 10 to receive connector 5 when connection is done between rigid frame 2 and connectionframe 10, and ground wire 3 extends from pit 11 to the television internal side and then through the rear side of television making connection to ground.

Figure 10:
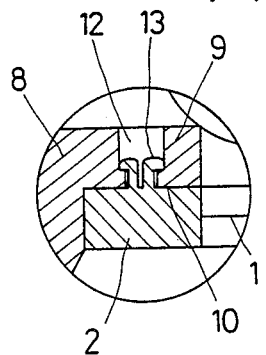
FIGS. 10, 11, and 12 are views showing combination methods for installing the invention in front of a television screen.
Figure 11:
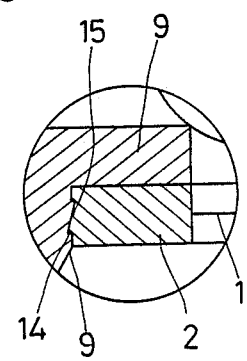
Figure 12:
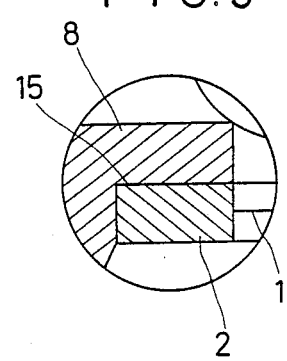

To reach close connection end, connection frame 10 can be choiced to provide clipping pit 12 while there is insert 13 provided integral with the backfire of rigid frame 2 to make adaption (as shown in FIG. 10). Another choice is to provide indent 14 in the sideface of connection frame 10 while there is bamboo shoot 15 provided at opposite location of rigid frame 2, by virtue of the rigid frame's resilient material close connection end is expected (as shown in FIG. 11). Also, using intense two-face glue to accomplish close connection end is applicable (as shown in FIG. 12). With these methods, the inventive shielding device can become an assembling part together with the finished television set leaving factory and later make assembly for use. With regard to the color television set used at present, if desired, there are always available like using corner bracket, two-face glue buckling belt (not shown in drawings) or any other to make the invention be secured in front of the television screen that will receive the same shielding effects.

I claim:

1. A shielding device for a color television screen comprising:

an electrically conductive mesh, a rigid frame, and a ground wire;

said mesh is formed by knitting black anti-reflection conductive filaments to diameter ranges of 20–100 micrometers and mesh aperture widths from 45–230 micrometers;

and wherein said filaments are laid against said rigid frame so that directions of the filaments are at angles of 10–45 degrees to said frame.

2. The shielding device of claim 1, wherein said electrically conductive mesh is integral with the display screen of the cathode ray tube, as a result of putting said device inside a television case and behind its front frame to place the electrically conductive mesh in close attachement to said display screen.

3. The shielding device of claim 2 wherein a concave connection frame is installed inside said front frame ;

said concave connection frame being adapted in size to the rigid frame to receive a connection which is attached to said ground wire.

* * * * *